(12) United States Patent
Nakane et al.

(10) Patent No.: US 6,191,554 B1
(45) Date of Patent: Feb. 20, 2001

(54) POWER TOOL CHARGING SYSTEM HAVING BATTERY RECONDITIONING AND BATTERY CAPACITY DATA UPDATING FUNCTIONS

(75) Inventors: Shinichi Nakane, Okazaki; Yutaka Matsunaga, Yokkaichi; Tomoo Muramatsu, Nisshinn; Kazuyoshi Horikawa, Tenryu, all of (JP)

(73) Assignees: Makita Corporation, Anjo (JP); Hondas Giken Kogyo Kabushiki, Tokyo (JP)

( * ) Notice: Under 35 U.S.C. 154(b), the term of this patent shall be extended for 0 days.

(21) Appl. No.: 09/345,010

(22) Filed: Jul. 2, 1999

(30) Foreign Application Priority Data

Jul. 2, 1998 (JP) .................................................. 10-187827

(51) Int. Cl.[7] ........................................................ H02J 7/00
(52) U.S. Cl. ............................................ 320/114; 320/107
(58) Field of Search ................................... 320/114, 107, 320/127, 128; 310/50

(56) References Cited

U.S. PATENT DOCUMENTS 5,430,363 * 7/1995 Kim ..................................... 320/128
5,903,423 * 5/1999 Okano et al. ......................... 320/107
6,046,575 * 4/2000 Demuro ............................... 320/134

FOREIGN PATENT DOCUMENTS 7-288935   4/1994   (JP) .
8-223812   1/1995   (JP) .

* cited by examiner

*Primary Examiner*—Peter S. Wong
*Assistant Examiner*—Lawrence Luk
(74) *Attorney, Agent, or Firm*—Foley, Hoag & Eliot, LLP (57) ABSTRACT

An improved charging system for preventing battery deterioration and for accurate indication of the remaining battery charge level includes an electric power tool (2) and a charger (1). The electric power tool (2) is provided with an internal rechargeable batteries (6) and a second controller (9). The charger (1) is provided with circuitry for charging, a microcomputer (19), and discharge circuitry which is comprised of a manually-operated battery refreshing button (25), a discharge relay (23) and a discharge resistor (24). Upon depression of the battery refreshing button (25), the microcomputer (19) causes the batteries (6) of the electric power tool (2) to be charged to a full level and discharged to a predetermined level twice. When the two-cycle operation of full charge and discharge is completed, the second controller (9) of the electric power tool (2) updates the remaining charge level of the batteries (6).

18 Claims, 8 Drawing Sheets

POWER TOOL CHARGING SYSTEM HAVING BATTERY RECONDITIONING AND BATTERY CAPACITY DATA UPDATING FUNCTIONS

This application claims priority on Japanese Patent Application No. 10-187827, the contents of which are incorporated herein by reference.

BACKGROUND OF THE INVENTION

1. Field of the Invention

The present, invention relates to battery-charging systems for electrical equipment. More particularly, the present invention relates to a battery-charging system that includes an electric power tool operating on rechargeable internal batteries and a battery charger for charging the internal batteries of the electric power tool.

2. Description of the Related Art

One type of conventional rechargeable electric power tool incorporates a detachable battery pack mounted in the lower end of the handle thereof. When the battery pack needs to be recharged, it is detached from the handle of the tool and set on a separate charger. After the charging is completed, the battery pack is mounted back in the handle to resume operation. If an electric power tool operating on a detachable battery pack is used for extended periods of time, for example, on a production or assembly line of an automobile plant, an auxiliary battery pack is set in a charger for recharging. When the pack mounted in the tool is discharged, the operator replaces it with the one that has been recharged by the charger and sets the discharged battery pack on the charger for recharging.

Battery packs used for the above-described purpose are generally designed to maximize their capacity and thus the operating time of the tool per charge. This tends to increase the size and weight of the packs, which in turn places an excessive physical strain on the operator and reduces the operability of the tools and work efficiency. This tendency is particularly pronounced when such large and heavy battery packs are used on assembly lines for an extended period of time; the operability of the tools may be severely affected so as to significantly reduce the productivity of the plant. In addition, loss of time in the process of replacing discharged battery packs has been a significant factor that reduces work efficiency.

Moreover, chargers used for such battery packs continue to supply charging current, even after the battery packs are charged to the full, therefore placing the batteries or cells in the pack under heavy load and reducing the charge efficiency. In addition, this results in a waste of power.

Figure 8:
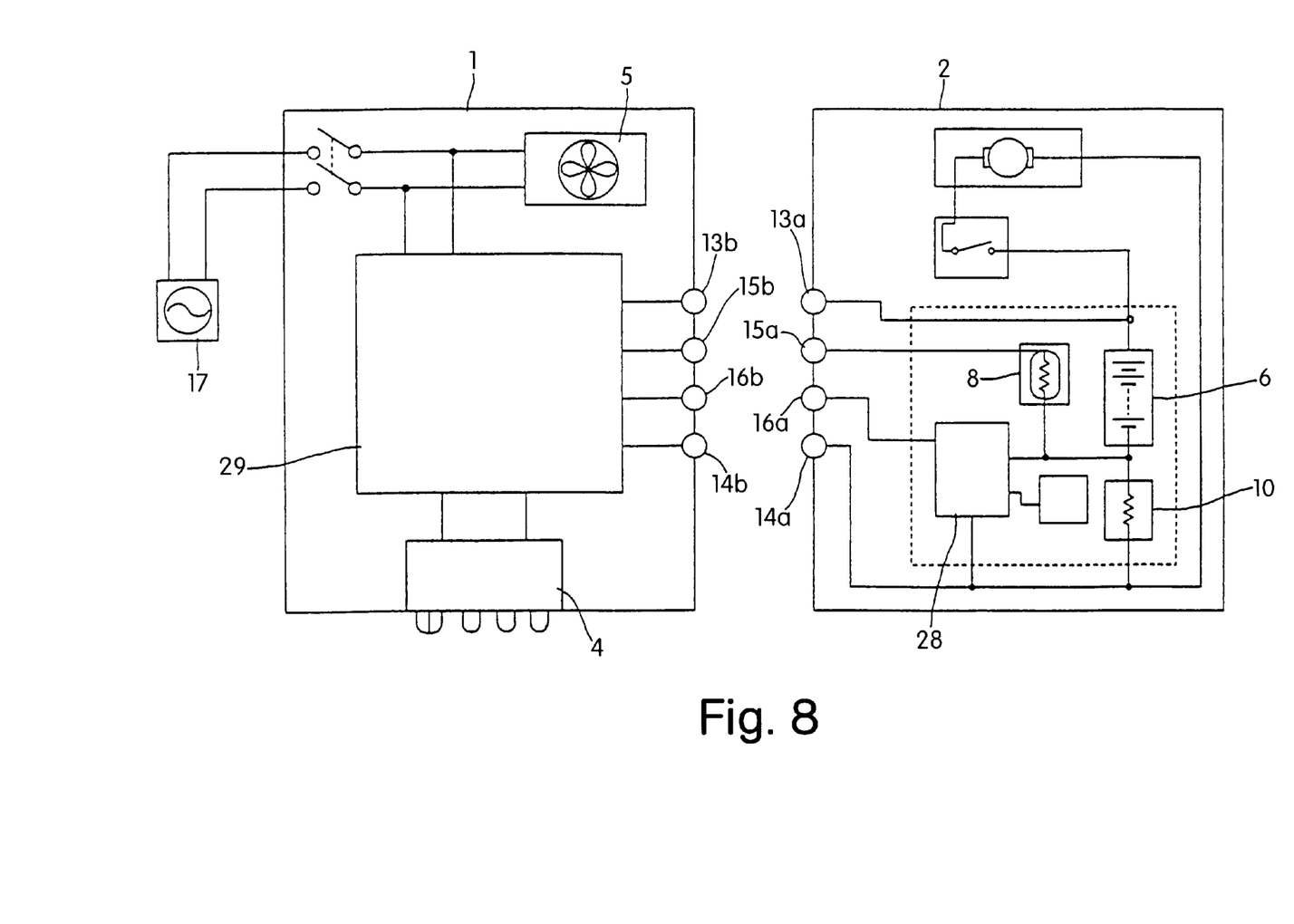
FIG. 8 is a schematic block diagram of a conventional electric power tool charging system which includes an electric power tool and a charger.

In view of the aforementioned problems, the applicant has proposed a battery-charging system as shown in FIG. 8. This battery-charging system includes a charger 1 and an electric power tool 2 which has a built-in batteries 6. According to this system, the batteries 6 can be charged without their removal from the tool 2. The electric power tool 2 additionally includes a controller 28 which in turn is provided with a central processing unit (CPU), a battery temperature sensor 8, and a current detector 10 for detecting the amperage of the charging and discharging currents of the batteries 6, which permit. monitoring of the remaining charge level based on the charging/discharging current. Also provided in the tool 2 are four terminals 13a, 14a, 15a, and 16a. The terminals 13a and 14a are provided for carrying current to charge the batteries 6, the terminal 15a is provided for outputting to the charger 1 data on the temperature of the batteries 6, and the terminal 16a is provided for outputting to the charger 1 the data on the charge/discharge level from the controller 28. The charger 1 is provided with four corresponding terminals for connection with these terminals 13a, 14a, 15a, and 16a so as to control charging operation based on data on battery charge/discharge received from the controller 28 and on the temperature of the batteries, and to indicate the charge/discharge level of the batteries.

Furthermore, the charger 1 includes a charge/discharge circuit 29, an indicator unit 4 for indicating the charge state and the remaining charge level of the batteries, and a cooling fan 5. Also included are the aforementioned four terminals that are connected to the terminals 13a, 14a, 15a, and 16a of the electric power tool 2 when it is set on the charger 1. These charger terminals comprise a pair of terminals 13b and 14b for passing charging current to the electric power tool 2, a data receive terminal 16b for receiving data on the charge/discharge level of the rechargeable batteries 6, and a temperature terminal 15b provided for receiving data on the temperature of the rechargeable batteries 6.

As described above, since this system permits charging of batteries without their removal, charging operation itself becomes much less troublesome, and the rechargeable batteries can always be charged to the full when the tool is not in use. Therefore, the charge capacity of the batteries can be reduced so as to reduce the weight of the tool itself. According to the system, by monitoring the remaining charge level, the operator can maintain the torque produced by the tool within a preferred range, which makes the system particularly useful when used on assembly or production lines in plants.

The installed controller transmits information on the charge/discharge level and on the battery temperature to the charger, allowing the charger to indicate the charge state of the batteries and to vary the charging current to suit the charge state. This enables efficient use of the batteries and enhances work efficiency.

Rechargeable batteries, such as nickel-cadmium (NiCad) batteries, deteriorate or have the property of decreasing in capacity if left unused for prolong periods of time or subjected to repeated charge and discharge at less than their full capacities. Since rechargeable batteries are consumable articles, their charge capacities gradually decrease over time, even if care is taken. This results in production of insufficient torque by tools, even after a full charge, and/or in discrepancies between the data on the remaining battery level stored in the aforementioned controller and the actual battery level, thus reducing the reliability of the charge level information provided by the system.

SUMMARY OF THE INVENTION

In view of the above-identified problems, an important object of the present invention is to provide a battery-charging system that improves the work efficiency and the operability of the electric power tool included in the system.

Another object of the present invention is to provide a battery-charging system that reconditions or rejuvenates rechargeable batteries and prolongs battery service life.

Still another object of the present invention is to provide a battery-charging system that improves the reliability of the information on the battery charge level provided by the system.

The above objects and other related objects are realized by the invention, which provides a power tool charging system which includes an electric power tool including at least one rechargeable battery on which the electric power tool operates and a charger on which the electric power tool is set for charging the at least one battery, with the charger including a discharge means for forcibly discharging the at least one battery.

According to one aspect of the present invention, the discharge means includes a relay, a resistor, and a battery refreshing switch which are placed in a circuit, with the at least one battery. In this system, the relay is closed by operating the battery refreshing switch so as to forcibly discharge the batteries via the resistor.

According to another aspect of the present invention, the charger further includes a first controller which, when the discharge means is activated, performs at least one cycle of charging the at least one battery to the full and discharging the at least one battery to a predetermined level.

According to still another aspect of the present invention, the first controller performs two cycles of fully charging the at least one battery and discharging the at least one battery to a predetermined level.

According to yet another aspect of the present invention, the first discharge of the at least one battery commences immediately after the first charge. Furthermore, the at least one battery is left standing for a predetermined period of time prior to the second discharge so as to measure the accurate charge level of the at least one battery.

In accordance with another aspect of the present invention, the at least one battery is determined to be fully charged based on the temperature and/or the voltage of the at least one battery, whereas the at least one battery is determined to be discharged to a predetermined level based on the voltage of the at least one battery.

In one practice, the at least one battery is charged for a third time to one of a full level and a predetermined level following the second discharge.

In another practice, the battery refreshing switch is a manually operated switch for causing the first controller to perform two cycles of fully charging the at least one battery and discharging the at least one battery to a predetermined level when the battery refreshing switch is turned on.

To carry out the invention in one preferred mode, the at least one battery is fully charged only once without being discharged unless the battery refreshing switch is turned on.

In one embodiment, the electric power tool further includes a second controller for monitoring the charge level of the at least one battery and for computing the charge level of the at least one battery, with the second controller updating data on the charge level of the at least one battery after the discharge means has forcibly discharged the at least one battery.

In another embodiment, the second controller updates the data on the charge level of the at least one battery upon completion of the two cycles of charging and discharging the at least one battery.

Other general and more specific objects of the invention will in part be obvious and will in part be evident from the drawing and description which follow.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENT

A preferred embodiment according to the present invention will be described hereinafter with reference to the attached drawings.

Figure 1:
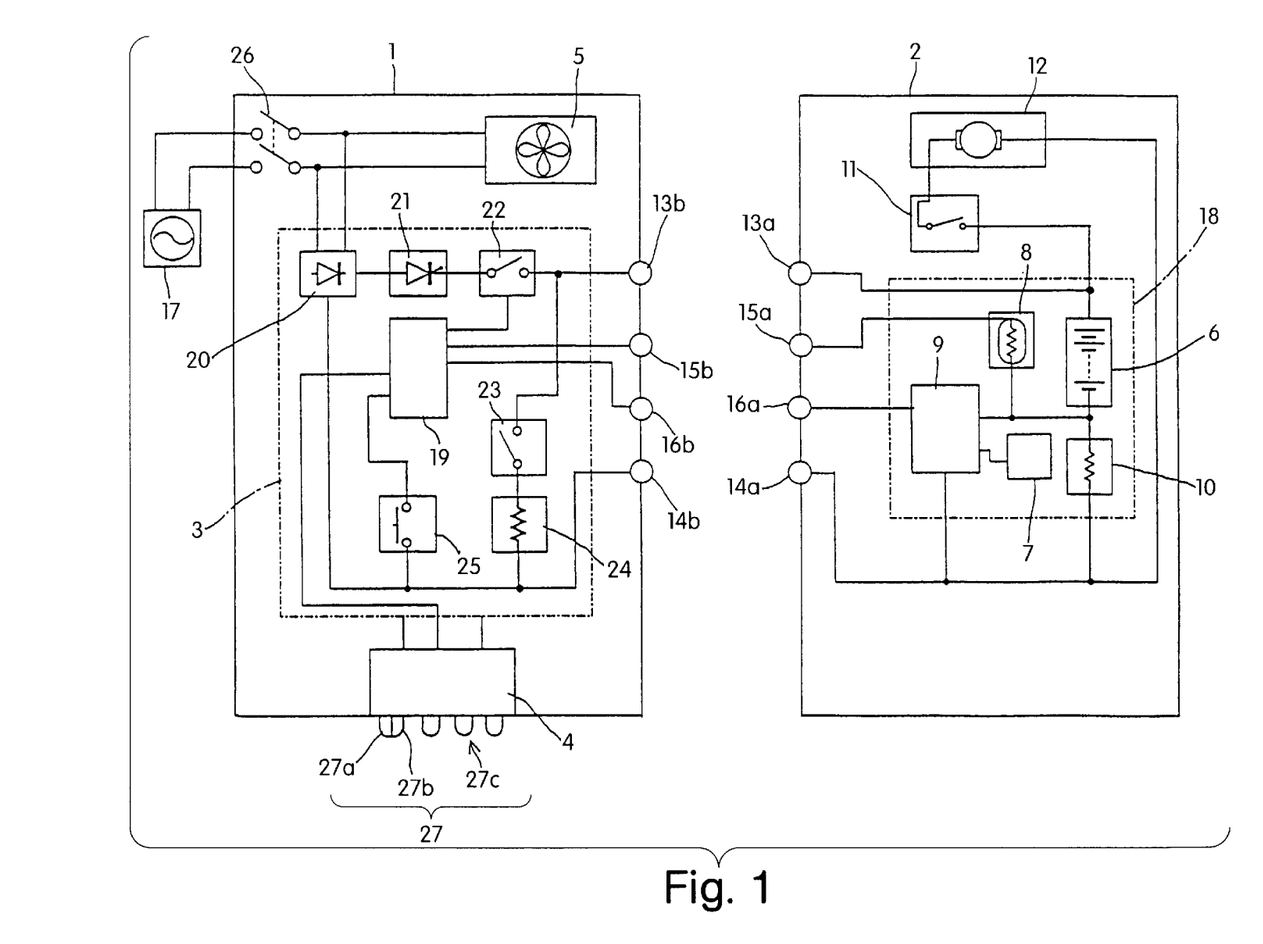
FIG. 1 is a schematic block diagram of an electric power tool charging system in accordance with the present invention including an electric power tool and a charger.

FIG. 1 is a schematic block diagram of an electric power tool charging system in accordance with the present invention. Identical or similar parts or elements to those in FIG. 8 are assigned identical reference numerals in FIG. 1. The charging system includes a charger 1 and an electric power tool 2. The charger 1 includes a charge/discharge circuit 3, a cooling fan 5, and an indicator unit 4 which is provided with five light-emitting diodes (LEDs) including a red LED 27a, a green LED 27b, and three yellow LEDs 27c.

The charger 1 is coupled to utility power 17. The charge/discharge circuit 3 includes a rectifier 20, a current controller 21, and a charge relay 22, and is controlled by a first controller, such as a microcomputer 19, so as to charge batteries 6 of the electric power tool 2 via a pair of charge terminal 13b and 14b.

Also included in the charger 1 are a discharge relay 23, a discharge resistor 24, and a manually-operated battery refreshing button 25, which in combination constitute means for discharging the batteries 6. The discharging means is connected with the charge terminal 13b and 14b via the discharge resistor 24 to constitute circuitry for discharging the rechargeable batteries 6. When the battery refreshing button 25 is switched on, the microcomputer 19 operates the charge relay 22 and the discharge relay 23 to charge and discharge the batteries 6.

The electric power tool 2 includes a battery unit 18 which contains the rechargeable batteries 6 (a plurality of nickel-cadmium (NiCad) batteries in series) and a motor 12 powered by the rechargeable batteries 6. The battery unit 18 further includes a current detector 10 for detecting the amperage of the charging and discharging currents of the batteries 6, and a temperature sensor 8 for sensing the temperature of the batteries 6. The battery unit 18 additionally includes a second controller 9 for computing the charge/discharge level of the batteries 6 based on the detected amperage of the charge and discharging currents and an indicator 7 for receiving data on the charge/discharge level from the second controller 9 and prompting the operator to recharge the batteries. Also provided in the tool 2 are four terminals 13a, 14a, 15a, and 16a corresponding to the four terminals of the charger 1. The terminals 13a and 14a are provided for carrying current to charge the batteries 6, the terminal 15a is provided for outputting to the charger 1 data on the temperature of the batteries 6, and the terminal 16a is provided for outputting to the charger 1 the data on the charge/discharge level from the second controller 9. Reference numeral 11 indicates a power switch of the electric power tool 2.

The second controller 9 also includes a central processing unit (CPU) which receives the data on the amperage of the batteries' discharging current from the current detector 10 and computing the discharge level of the batteries 6 while the electric power tool 2 is in use. The CPU also receives the data on the amperage of the batteries' charging current from the current detector 10 and computes the charge level of the batteries 6 while the batteries are recharged. In this manner, the second controller 9 continuously monitors the remaining battery level.

The temperature sensor 8 may be a thermistor whose electrical resistance, which corresponds to the temperature of the batteries 6, can be converted to a voltage so as to measure the temperature of the batteries 6. For the current detector 10, a resistor can be used to convert the amperage of the charging/discharging current to a voltage, which is then transmitted to the second controller 9.

Figure 2:
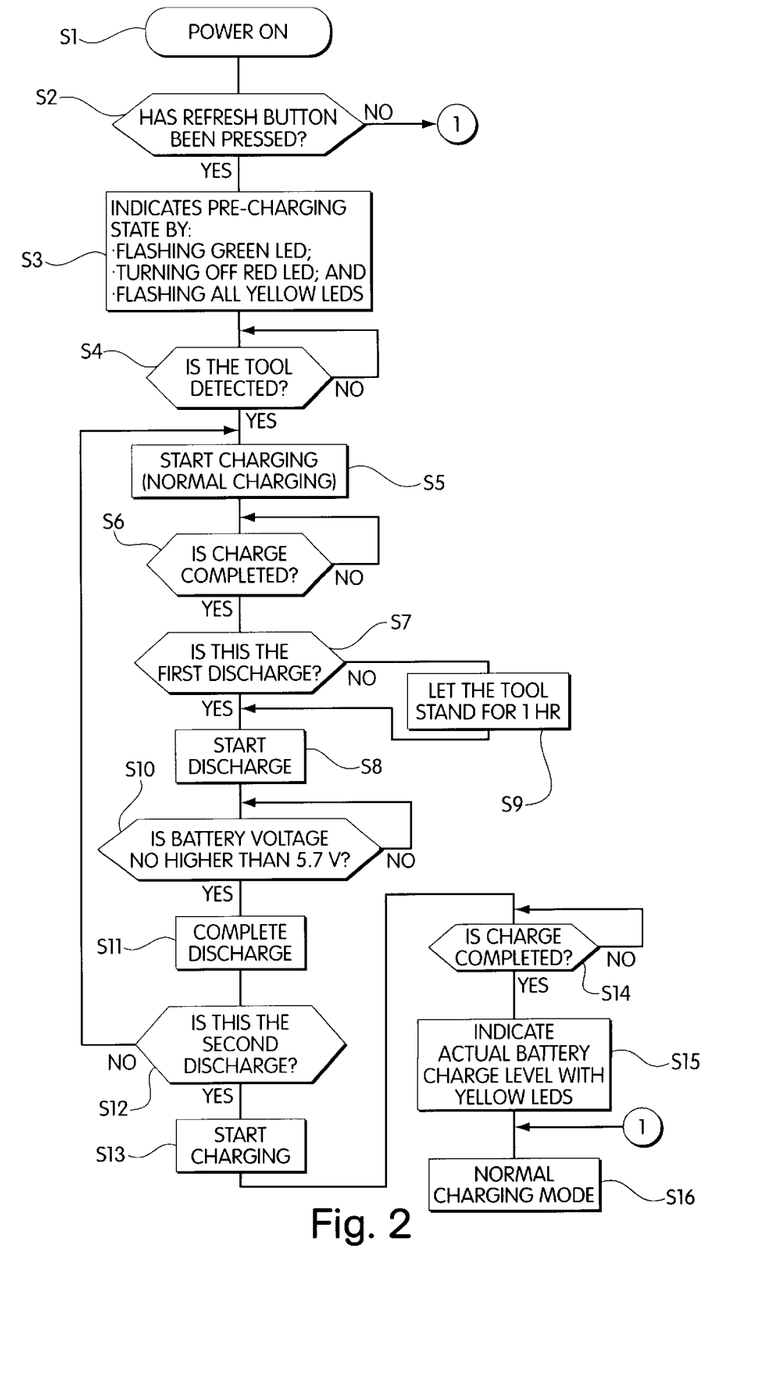
FIG. 2 is a flowchart describing the process of forced discharge of battery performed by the microcomputer of the system shown in FIG. 1.

FIG. 2 is a flowchart which describes the process of forced discharge of battery performed by the microcomputer 19 shown in FIG. 1.

The process described in the flowchart starts when power is turned on to activate the microcomputer 19 (step 1). At the following step 2, it is determined whether or not the battery refreshing button 25 has been manually depressed. If YES, the process proceeds to step 3 to go into a battery refreshing mode. If NO, the process goes to step 16 to enter a normal charging mode, in which the second controller 9 provides data on the conditions of the batteries 6 so as to charge the batteries to full capacity or a predetermined level.

At step 3, the microcomputer 19 causes the indicator unit 4 to indicate charging has yet to start. More particularly, the green LED 21b flashes, while the red LED 21a turns off, and the three yellow LEDs 21 flash. When the process reaches step 4, at which point it is determined whether the battery temperature is read out from the temperature terminal 15a, indicating that the electric power tool 2 is set on the charger 2. If YES, or if the electric power tool 2 is set in place for charging, the process goes to step 5, at which point normal charging starts.

At the next step 6, charging is continued until it is determined that the batteries 6 are fully charged based on the data on the voltage between the charge terminals and on the battery temperature obtained from the temperature terminal 15b. The batteries 6 are judged to be fully charged when, for example, the battery voltages measures 12.6 V or higher, or when the battery temperature is no lower than 73 degrees Celsius.

When the charging is completed, the process proceeds to step 7, where it is determined whether this is the first discharge operation. If YES, discharging commences by closing of the discharge relay 23 so as to short-circuit the batteries via the discharge resistor 24 at the following step 8. If NO, after the batteries are left standing for one hour so as to dissipate heat, discharging is then performed.

At step 10, it is determined whether or not the battery voltage is no higher than 5.7 V. If this query produces an affirmative indication, the batteries 6 are determined to be sufficiently discharged, with the result that the process goes to step 11, at which point the discharge operation is terminated by opening the discharge relay 23. The discharge operation is sustained until the battery voltage falls to or below the threshold value. The process proceeds to step 12, at which point determination is made as to whether or not the batteries have been discharged twice since the beginning of this process. If NO, or if discharging has been performed only once, the process returns to step 5 to charge and discharge the batteries 6 for the second time. If YES, or if the second discharge has been performed, the process goes to step 13 to commence charging. At the following step 14, the charging is terminated when the same conditions as those at step 6 are met, bringing the process to step 15, at which point the data on the battery charge level is read from the terminal 16b and, for the convenience of the operator, indicates the information by lighting a specified number of the three yellow LEDs 27c. In this embodiment, for example, if the charge level of the batteries 6 is 800 mAh or higher, all three yellow LEDs 27c are lit. If the charge level of the batteries 6 is between 700 mAh and 800 mAh, two are lit. If the charge level is between 600 mAh and 700 mAh, one is lit. If the charge level is less than 600 mAh, none of the yellow LED 27c is lit.

At step 16, the process exits the battery refreshing mode and enters the normal charging mode. In this particular refreshing mode, the batteries 6 are first charged to a full level and then discharged to a predetermined level; however, the sequence of operation may be reversed if it is preferred.

According to the foregoing process, since the battery refreshing mode repeats two cycles of full charge and sufficient discharge operations by depression of the battery refreshing button, the batteries can be reconditioned (rejuvenated) so as to regain their initial capacity, even after the capacity has deteriorated or after the batteries has been operating at less than their full capacity.

Figure 3:
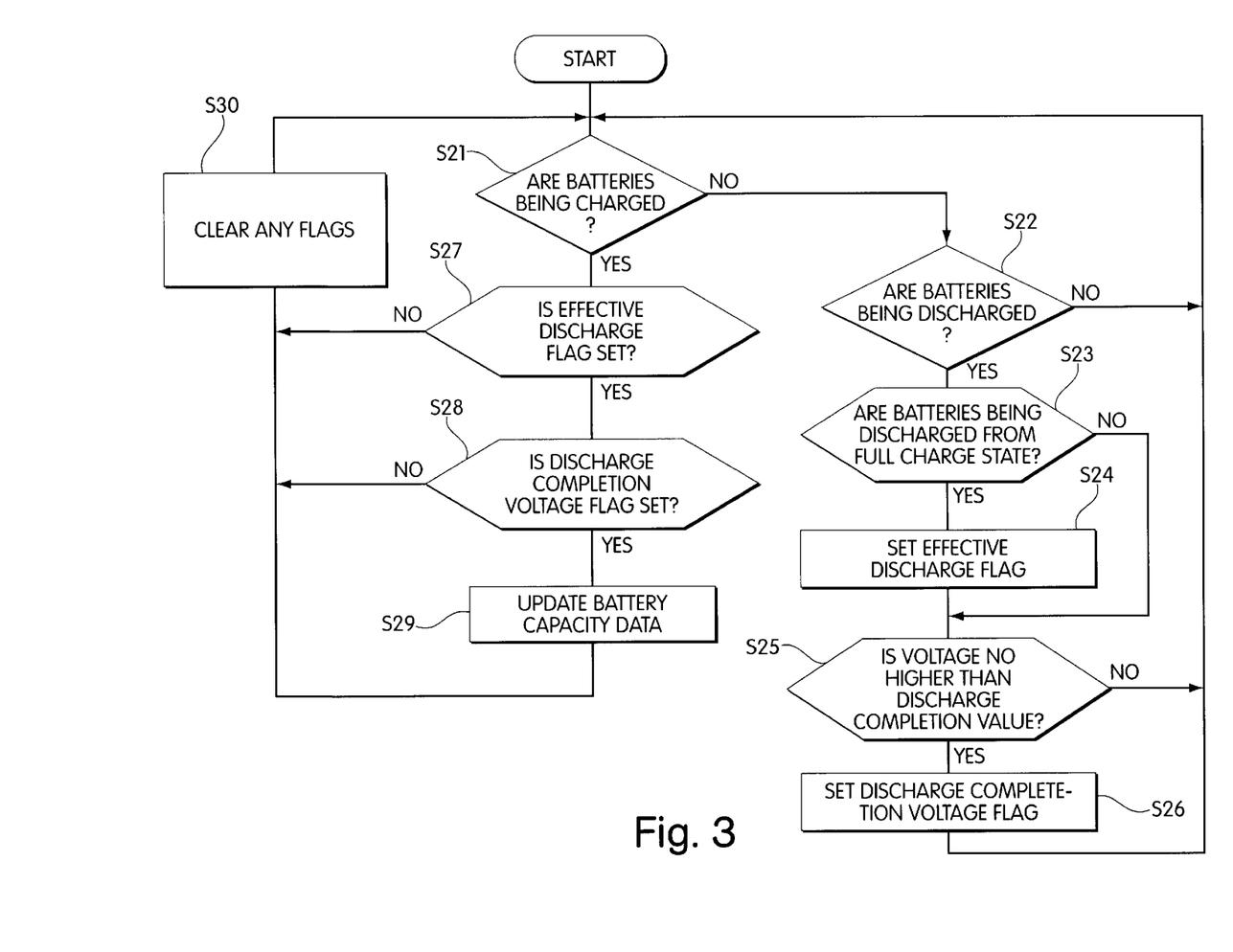
FIG. 3 shows a flowchart which describes the process by which the second controller 9 of the system of FIG. 1 learns the combined capacity of the batteries 6.

FIG. 3 shows a flowchart which describes the process by which the second controller 9 learns the combined capacity of the batteries 6.

Upon commencement of this process, the second controller 9 determines whether or not the rechargeable batteries 6 are being charged at step 21. If YES, the process proceeds to step 27. If NO, the process goes to step 22, at which point it is determined whether or not the batteries are being discharged. If the answer is YES, the process proceeds to step 23. If NO, i.e., if the batteries are neither charged nor discharged, the process returns to step 21.

If the batteries are determined to be on charge at step 22, it is then determined at the following step 23 if the batteries 6 are being discharged from a fully charged state. If so, an effective discharge flag is set at step 24, with the process proceeding to step 25. If a negative answer is produced at step 23, the process bypasses step 24, going directly to step 25. At this step, determination is made as to whether or not the battery voltage is no higher than a discharge completion value (for example, 5.7 V). If the query produces an affirmative indication, a discharge completion flag is set at step 26. If the answer is NO at step 25, the process goes back to step 21.

If YES, i.e., if the batteries 6 are being charged at step 21, the process proceeds to stop 27, at which point it is determined whether or not the effective discharge flag is set. If it is not, the path leads to step 30, at which point any existing flag is cleared, with the process going back to step 21. If it is determined at step 27 that the effective discharge flag has been set, the process goes on to step 28, at which point setting of the discharge completion flag is checked. If YES, the data on the battery charge level stored in the second controller 9 is updated to complete the learning process. Subsequently, all the flags are cleared at step 30, whereupon the process goes back to step 21. According to this process, the battery charge level stored in the second controller 9 is updated after the batteries have been discharged, i.e., the battery voltage has reached the discharge completion voltage, from a fully charged state.

As described above, since the second controller 9 learns the combined capacity of the batteries and updates the stored battery charge level only after the batteries have been discharged from a fully charged state, no discrepancy between the remaining charge level indicated by stored data and the actual charge level results. Accordingly, if the full battery capacity decreases, for example, by deterioration or degradation, the data indicative of the remaining charge level can be modified so as to maintain the accuracy of the data, thereby preventing the inconvenience caused by the above-described discrepancy, as often occurs in conventional systems.

FIGS. 4 to 7 show the charging system of FIG. 1 as applied to an impact screwdriver 30 and its charger 31. Similar or identical reference numerals in FIGS. 1 and 4–6 designate identical or corresponding parts and elements.

Figure 4:
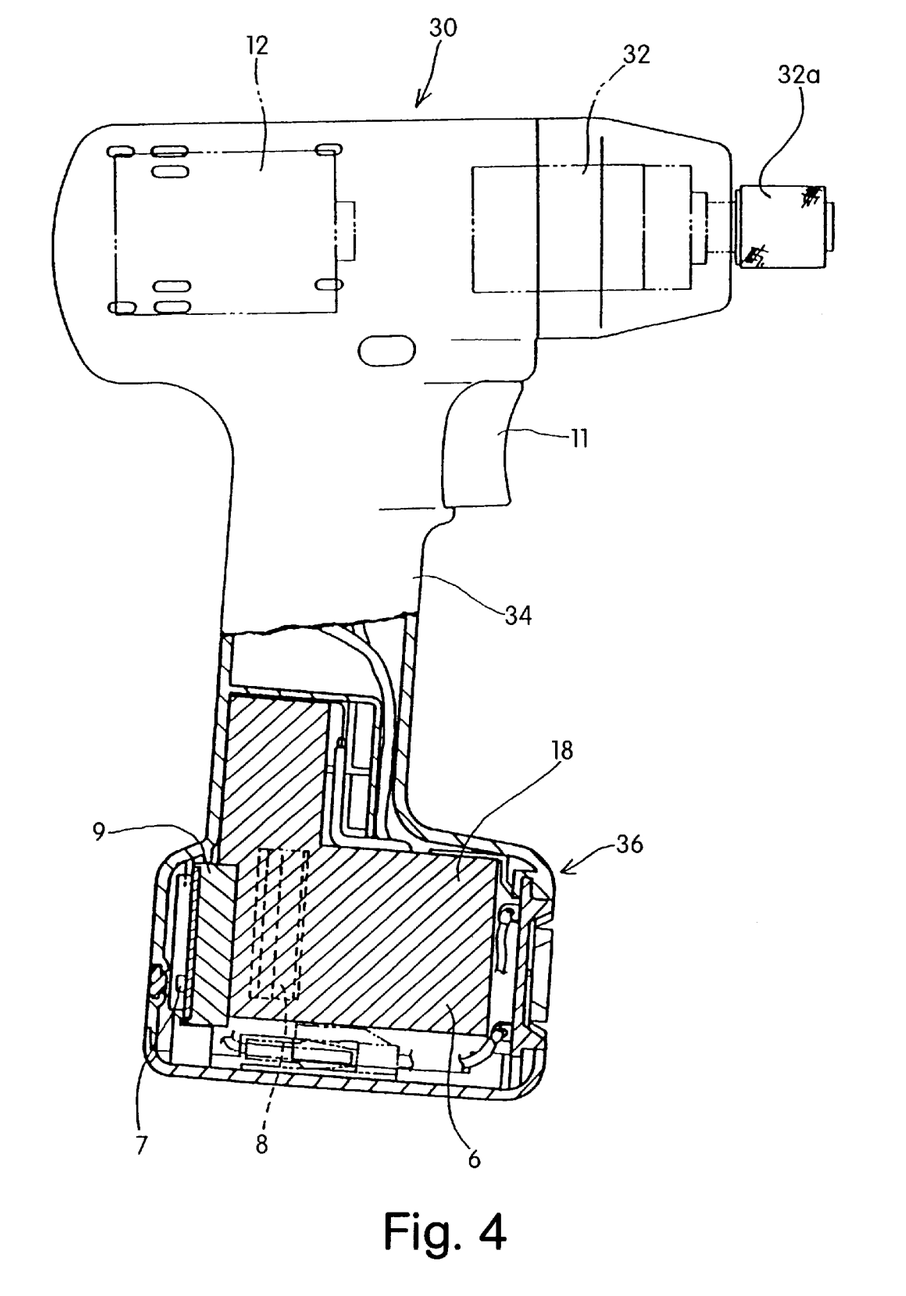
FIG. 4 is a partially cutaway side elevation of a rechargeable impact screwdriver to which the circuitry described in the left half of the schematic block diagram of FIG. 1 is applied.

FIG. 4 is a partially cutaway side elevation of the impact screwdriver 30 to which the circuitry described in the upper half of the schematic block diagram of FIG. 1 is applied.

The impact screwdriver 30 includes a motor 12 interlocked with an hydraulic unit 32 by means of a reducer (not shown). The hydraulic unit 32 is coupled to a nose or chuck (driven unit) 32a to which a tool bit (not shown in this figure; see FIG. 7) is attached. During operation, the torque produced by the motor 12 is transmitted to the tool bit by means of the reducer, the hydraulic unit 32, and the nose 32a. The hydraulic unit 32 allows the transmitted torque to vary in response to the load applied to the tool bit so as to tighten screws and bolts. The impact screwdriver 30 additionally includes a grip handle 34 and the battery unit 18 installed in the lower portion of the grip handle 34. The batteries 6 can be removed from the impact screwdriver 30 through the bottom surface of the grip handle 34. In addition, the bottom portion of the grip handle 34 includes a protrusion 36 which is located on the same side of the handle 34 as the nose 32a and which extends approximately parallel to the nose 32a of the impact screwdriver 30. The protrusion 36 includes the terminals 13a, 14a, 15a, and 16a mounted on the inner surface thereof so as to establish electrical contact with the corresponding terminals 13b, 14b, 15b, and 16b of the charger 31. In addition, the aforementioned indicator 7, which includes a light-emitting diode (LED), is provided on the controller 9 to indicate to the operator the charge level of the batteries 6.

Figure 5:
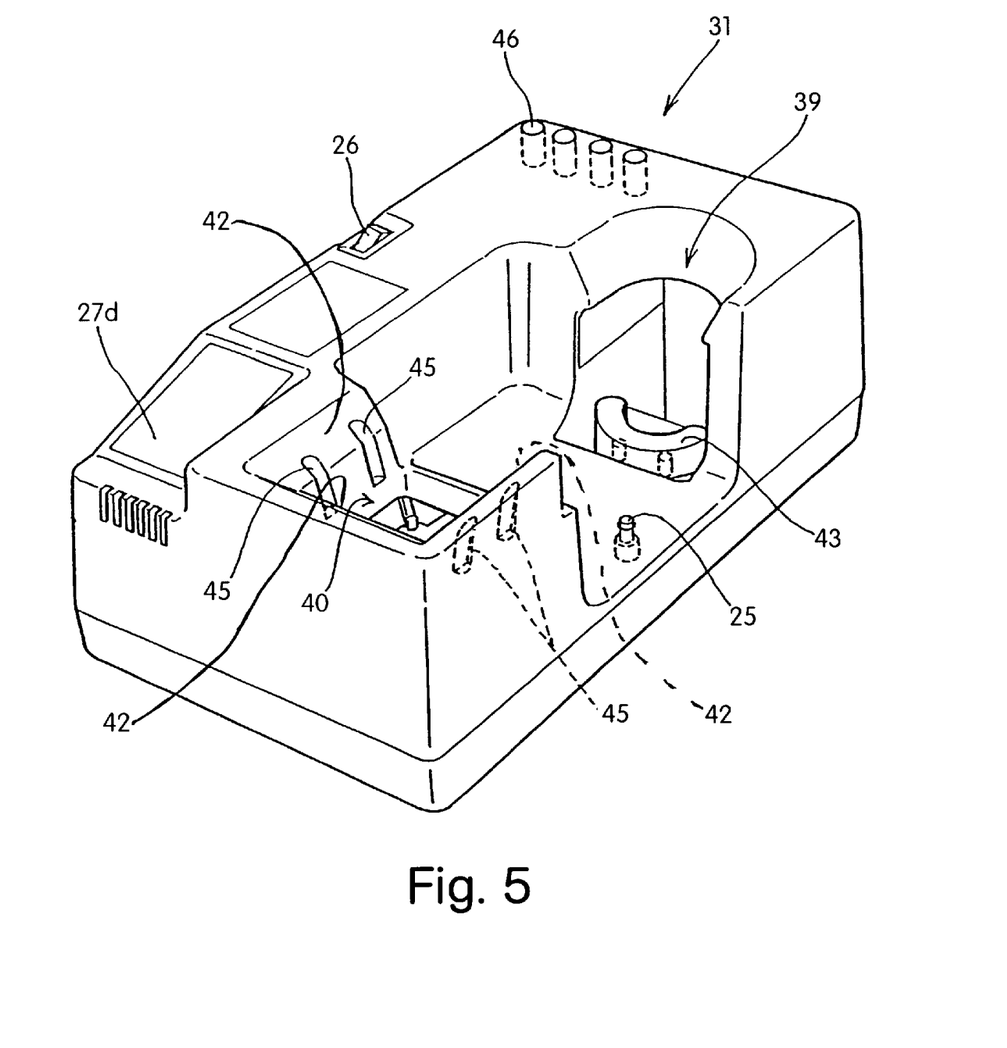
FIG. 5 is a perspective view of a charger to which the circuitry described in the right half of the schematic block diagram of FIG. 1 is applied.
Figure 6:
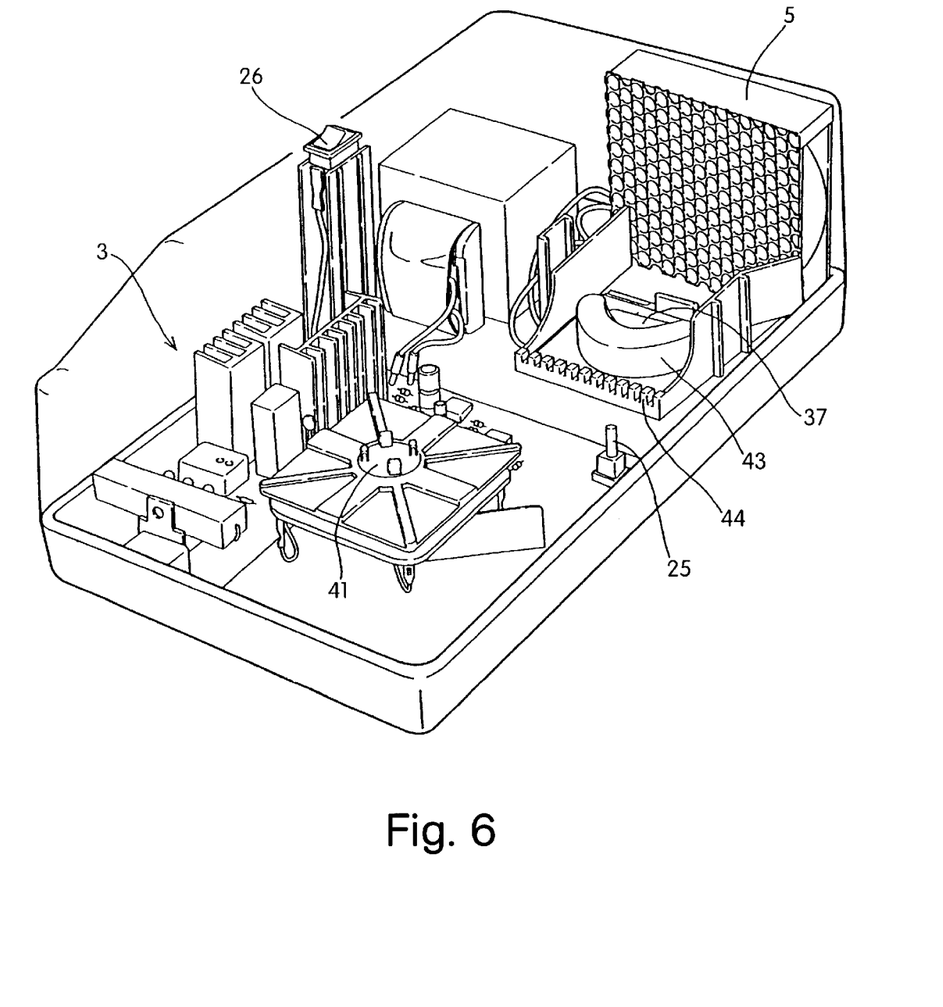
FIG. 6 is a perspective view of the charger shown in FIG. 5, illustrating the internal structure within the casing.

Referring to FIGS. 5 and 6, the charger 31 is formed with a first receiving recess 39 for accommodating the nose 32a of the impact screwdriver 30 and the second receiving recess 40 for accommodating the protrusion 36 of the handle grip 34. Accordingly, the impact screwdriver 30 can be placed on the charger 31 with the nose 32a oriented downward for charging. Formed on the bottom surface of the second receiving recess 40 is a circular protrusion 41 exposing the four terminals 13b, 14b, 15b, and 16b of the charger 31 for connection with the corresponding terminals 13a, 14a, 15a, and 16a of the screwdriver 30. The refresh button 25 is disposed between the first receiving recess 39 and second receiving recess 40.

As shown in FIG. 6, the first receiving recess 39 has an opening 37 at the bottom thereof so that the impact screwdriver 30 can be set on the charger 31 without removing the tool bit. A rubber cushion 43 is provided on the opening 37 for absorbing the impact of the screwdriver 30 as it is set on the charger 31. This rubber cushion 43 is replaceably fit in the bottom surface of the charger 31 such that dimensions, such as the height, of the support can be changed when a new replacement cushion is fitted in the charger 31. Furthermore, a cooling fan 5 is installed in proximity to the first receiving recess 39 so as to cool the nose 32a of the screwdriver 30. A plurality of venting slits 44 are formed in a wall in the charger's enclosure directly opposing the fan 5 so that air drawn by the cooling fan 5 is sent into the enclosure to efficiently cool the inside of the charger 31.

Referring again to FIG. 5, the second receiving recess 40 is rimmed with tapering guide slopes 42 for positioning the impact screwdriver 30 so as to establish secure electrical contact of the terminals in the circular protrusion 41 with the terminals of the screwdriver 30 when it is set on the charger 31. The second receiving recess 40 also prevents the impact screwdriver 30 from being displaced once the screwdriver is set for a battery charge.

Additionally, two vertical grooves 45 are formed in each of the right and left guide slopes 42. Fixture rods (not shown) can be set in the vertical grooves 45 so as to adjust the width of the opening of the second receiving recess 40, allowing differently sized impact drivers or other types of tools to be set on the charger 31 stably and further to allow the two sets of terminals to be securely connected. Combined with a rubber cushion of a suitable height, the charger 31 can be used with a wide range of tools operating on internal rechargeable batteries.

Still referring to FIG. 5, the charger 31 additionally includes the display window 27d for the LEDs 27 and a plurality of cylindrical tool bit holders 46 for inserting tool bits, such as a bit 47 (see FIG. 7), when the impact screwdriver 30 is being charged. These holders 46 are convenient when a plurality of tool bits are used, as the holders reduce the possibility of time wasted because of misplaced tool bits.

Figure 7:
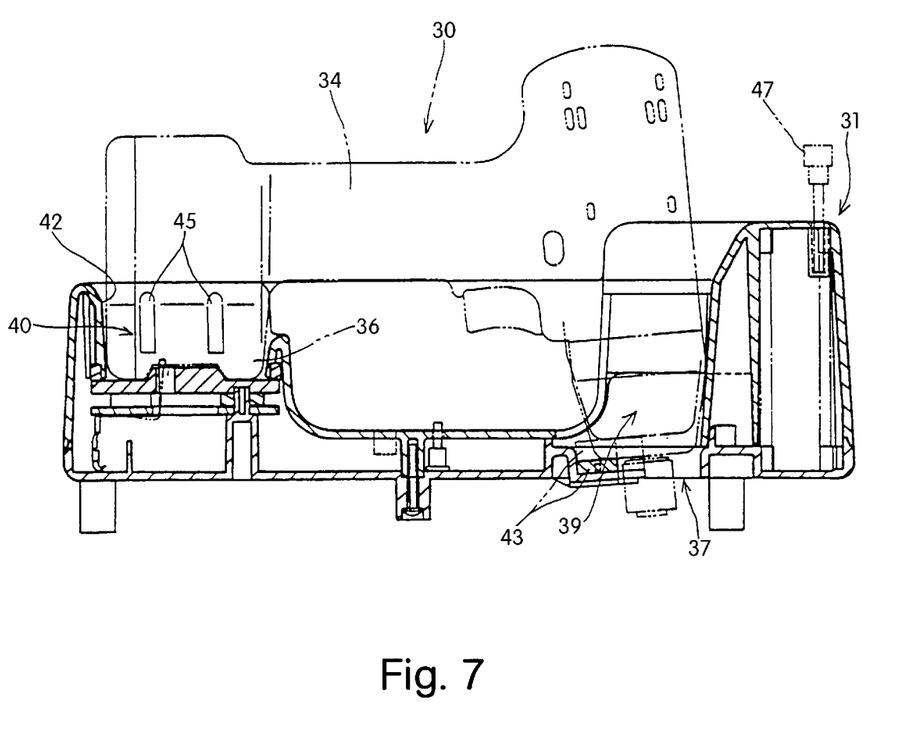
FIG. 7 is a lengthwise cross section of the charger shown in FIG. 5 with the impact, screwdriver (shown in two-dot chain lines) set thereon for recharging.

FIG. 7 is a lengthwise cross section of the charger 31 with the impact screwdriver (shown in two-dot chain lines) set thereon for recharging. As illustrated, the nose 32a is supported in the first receiving recess 39 with the bit in the opening 37, while the protrusion 36 on the handle grip 34 is supported in the second receiving recess 40. As both ends of the tool 30 are supported simply by setting the tool on the charger 31, secure contact is established between the terminals of the charger 31 and those of the tool 30.

In the foregoing embodiment, two cycles of charging and discharging are performed when the batteries 6 are forcibly discharged. One or three or more cycles may be performed in accordance with the present invention. However, considering the time, cost, and the effect of battery recovery or rejuvenation, two cycles are preferred. Those with ordinary skill in the art to which the invention pertains will also appreciate the thresholds, values, and features used in connection with the foregoing embodiment can be changed or modified without departing from the spirit of the invention.

According to the invention, because the batteries are built in the electric power tool in such a manner as to allow the batteries to be charged simply by setting the tool on the charger, the charging operation is greatly simplified. Furthermore, the forced discharge of the built-in batteries enables charging from a state of sufficient discharge and thus enables reconditioning or rejuvenation of the batteries.

Since the batteries are repeatedly discharged from the state of full charge, they can be reconditioned or rejuvenated so as to regain their full capacity, even if they have deteriorated or degraded.

Furthermore, according to the invention, once a specified number of cycles of charge and discharge of the batteries are performed by the charger, the second controller of the tool learns and refreshes the data on the remaining charge level of the batteries, resulting in more reliable information about the battery capacity.

EQUIVALENTS

It will thus be seen that the present invention efficiently attains the object set, forth above, among those made apparent from the preceding description. As other elements may be modified, altered, and changed without departing from the scope or spirit of the essential characteristics of the present invention, it is to be understood that the above embodiments are only an illustration and not restrictive in any sense. The scope or spirit of the present invention is limited only by the terms of the appended claims.

What is claimed is:

1. A power tool charging system, comprising:
   an electric power tool including at least one rechargeable battery on which the electric power tool operates; and
   a charger on which the electric power tool is set for charging the at least one battery, the charger including a discharge means for forcibly discharging the at least one battery.

2. A system in accordance with claim 1, wherein the discharge means includes a relay, a resistor, and a battery refreshing switch which are placed in a circuit with the at least one battery, wherein the relay is closed by operating the battery refreshing switch so as to forcibly discharge the batteries via the resistor.

3. A system in accordance with claim 1, wherein the charger further includes a first controller which, when the discharge means is activated, performs at least one cycle of fully charging the at least one battery and discharging the at least one battery to a predetermined level.

4. A system in accordance with claim 3, wherein the first controller performs two cycles of fully charging the at least one battery and discharging the at least one battery to a predetermined level.

5. A system in accordance with claim 4, wherein the first discharge of the at least one battery commences immediately after the first charge, and further wherein the at least one battery is left standing for a predetermined period of time prior to the second discharge so as to measure the accurate charge level of the at least one battery.

6. A system in accordance with claim 5, wherein the at least one battery is determined to be fully charged based on at least one of the temperature and the voltage of the at least one battery and the at least one battery is determined to be discharged to a predetermined level based on the voltage of the at least one battery.

7. A system in accordance with claim 4, wherein the at least one battery is charged for a third time to one of a full level and a predetermined level following the second discharge.

8. A system in accordance with claim 6, wherein the battery refreshing switch is a manually operated switch for causing the first controller to perform two cycles of fully charging the at least one battery and discharging the at least one battery to a predetermined level when the battery refreshing switch is turned on.

9. A system in accordance with claim 8, wherein the at least one battery is fully charged once without being discharged unless the battery refreshing switch is turned on.

10. A system in accordance with claim 1, wherein the electric power tool further includes a second controller for monitoring the charge level of the at least one battery and for computing the charge level of the at least one battery, the second controller updating data on the charge level of the at least one battery after the discharge means has forcibly discharged the at least one battery.

11. A system in accordance with claim 10, wherein the second controller updates the data on the charge level of the at least one battery upon completion of the two cycles of charging and discharging the at least one battery.

12. A method for charging an electric power tool including at least one rechargeable battery on which the electric power tool operates, said method comprising the step of cycling the at least one battery through at least one cycle of charging the at least one battery fully and discharging the at least one battery to a predetermined level.

13. A method according to claim 12, wherein said cycling step includes cycling the at least one battery through two consecutive cycles of charging the at least one battery fully and discharging the at least one battery to a predetermined level.

14. A method according to claim 13, wherein said cycling step includes
   commencing the first discharge of the at least one battery immediately after the first charge, and
   leaving the at least one battery standing for a predetermined period of time prior to the second discharge so as to measure the accurate charge level of the at least one battery.

15. A method according to claim 14, wherein said cycling step includes
   determining the at least one battery to be fully charged based on at least one of the temperature and the voltage of the at least one battery, and
   determining the at least one battery to be discharged to a predetermined level based on the voltage of the at least one battery.

16. A method according to claim 13, further comprising the step of charging the at least one battery for a third time to one of a full level and a predetermined level following the second discharge.

17. A method for monitoring the charge level of an electric power tool including at least one rechargeable battery on which the electric power tool operates, said method comprising the steps of
   computing the charge level of the at least one battery, and
   updating the data on the charge level of the at least one battery after the at least one battery has been discharged.

18. A method according to claim 17, wherein said updating step includes updating the charge level of the at least one battery after two consecutive cycles of charging the at least one battery fully and discharging the at least one battery to a predetermined level have been performed.

* * * * *

UNITED STATES PATENT AND TRADEMARK OFFICE
CERTIFICATE OF CORRECTION

| | | |
|---|---|---|
| PATENT NO. | : 6,191,554 B1 | Page 1 of 1 |
| DATED | : February 20, 2001 | |
| INVENTOR(S) | : Shinichi Nakane et al. | |

It is certified that error appears in the above-identified patent and that said Letters Patent is hereby corrected as shown below:

<u>Title page,</u>
Item [73], replace "Assignees: Makita Corporation, Anjo (JP); and Hondas Giken Kogyo Kabushiki, Toyko (JP)" with -- Assignees: Makita Corporation, Anjo (JP); and Honda Giken Kogyo Kabushiki Kaisha, Tokyo (JP) --

Signed and Sealed this

Twenty-seventh Day of January, 2004

JON W. DUDAS
*Acting Director of the United States Patent and Trademark Office*